United States Patent [19]

Takago et al.

[11] Patent Number: 4,618,646

[45] Date of Patent: Oct. 21, 1986

[54] ROOM TEMPERATURE-CURABLE ORGANOPOLYSILOXANE COMPOSITION

[75] Inventors: Toshio Takago; Masatoshi Arai; Koji Futatsumori, all of Gunma, Japan

[73] Assignee: Shin-Etsu Chemical Co., Ltd., Tokyo, Japan

[21] Appl. No.: 753,319

[22] Filed: Jul. 9, 1985

[30] Foreign Application Priority Data

Jul. 9, 1984 [JP] Japan ................................ 59-141974

[51] Int. Cl.$^4$ .............................................. C08K 3/10
[52] U.S. Cl. ..................................... 524/783; 524/786; 524/789; 524/788; 524/859; 524/860; 525/100; 525/104; 525/106; 528/25; 528/29; 528/33; 528/34; 528/35
[58] Field of Search ....................... 528/35, 33, 34, 25, 528/29; 524/789, 783, 786, 788, 860, 859; 525/100, 104, 106

[56] References Cited

U.S. PATENT DOCUMENTS 4,490,416 12/1984 Westall et al. ......................... 528/34
4,552,919 11/1985 Mikami et al. ......................... 528/34

*Primary Examiner*—Melvyn I. Marquis
*Attorney, Agent, or Firm*—Toren, McGeady, Stanger, Goldberg & Kiel

[57] ABSTRACT

The room temperature-curable (RTV) organopolysiloxane composition of the invention comprises, in addition to the conventional components of a diorganopolysiloxane terminated at both molecular chain ends each with a silanolic hydroxy group, a hydrolyzable organosilicon compound having two or more hydrolyzable groups in a molecule and a filler, an organosilicon-modified polyoxyalkylene compound, of which the organosilicon-containing terminal groups have at least one hydrolyzable group so as to pertain to the crosslinking reaction in its part. By virtue of this unique additive component, the composition is quite free from the disadvantage of sagging when the composition is applied to building works and the like and still retains excellent adhesive properties to the substrate surface in contrast to the difficulty in the conventional RTV compositions in which reducing of the phenomenon of sagging and retention of the strong adhesive strength are hardly compatible.

3 Claims, No Drawings

ROOM TEMPERATURE-CURABLE ORGANOPOLYSILOXANE COMPOSITION

BACKGROUND OF THE INVENTION

The present invention relates to a room temperature-curable organopolysiloxane composition or, more particularly, to a room temperature-curable organopolysiloxane composition which is outstandingly free from the disadvantage in working therewith that the uncured composition as applied sags down by the gravity to lose the once-shaped desired form.

Various types of room temperature-curable or vulcanizable organopolysiloxane compositions (referred to as RTV composition hereinbelow) are known and widely used as a sealing or caulking material, coating material and adhesive in the fields of building construction and mechanical and electrical industries by virtue of their excellent properties. While an uncured RTV composition, capable of being cured into a rubbery elastomer by standing in a moisture-containing atmosphere at room temperature, usually has a pasty consistency susceptible to deformation or flow under an outer force, it is essential that the RTV composition is free from the problem of sagging in the absence of outer forces excepting gravity when it is used as a sealing material in buildings and instruments. Conventional products of RTV compositions are more or less not free from this problem so that most of RTV compositions are prepared with admixture of a sagging-reducing agent to reduce, if not completely, this undesirable phenomenon.

Several kinds of sagging-reducing agents are known to be effective in silicone RTV compositions. For example, U.S. Pat. No. 4,100,129 teaches the use of a trifunctional organopolysiloxane of high phenyl content and a fumed silica filler in combination although this method is questionable in respect of the effectiveness of the method despite the expensiveness of the special organopolysiloxane. An alternative method is known in which a surface-treated fumed silica filler is used as a sagging-reducing agent, optionally, in combination with the above mentioned trifunctional high-phenyl organopolysiloxane. If not to mention the relative expensiveness of the surface-treated fumed silica filler, this method is also not free from the problem of the increased elastic modulus or decreased rubbery elasticity of the cured RTV composition to cause fracture of the sealing or insufficient sealing effect when it is used as a sealing material because the desired sagging-reducing effect can be obtained only by compounding a relatively large amount of the filler.

It is also known that addition of a polyoxyalkylene compound to RTV compositions is effective in reducing sagging of the composition (see, for example, Japanese Patent Kokai No. 56-853). A problem in this method is the bleeding of the additive on the surface of the cured RTV composition as a result of the high mobility of the polyoxyalkylene in the organopolysiloxane composition so that the adhesive strength between the cured RTV composition and the substrate surface may sometimes be unduly low to cause peeling of the cured composition from the substrate surface.

SUMMARY OF THE INVENTION

It is therefore an object of the present invention to provide a novel and improved RTV composition of low sagging which is free from the above described problems and disadvantages in the prior art RTV compositions.

The low-sagging RTV composition provided by the invention comprises:

(a) 100 parts by weight of a diorganopolysiloxane of a substantially linear molecular structure terminated at both molecular chain ends each with a silanolic hydroxy group;

(b) from 0.5 to 30 parts by weight of a hydrolyzable organosilicon compound or a mixture of hydrolyzable organosilicon compounds of which the average number of the hydrolyzable groups is at least 2.01 per molecule;

(c) from 5.0 to 300 parts by weight of a filler; and (d) from 0.1 to 5.0 parts by weight of an organosilicon-modified polyoxyalkylene compound of which the molecular main chain is formed of the recurring units represented by the general formula $-R^1-O-$, in which $R^1$ is an ethylene or propylene group, and at least one of the molecular chain ends is terminated with a silicon-containing group represented by the general formula

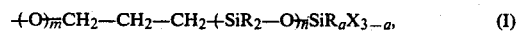

$$\pe{-(O)_m CH_2-CH_2-CH_2-(SiR_2-O)_n SiR_a X_{3-a}}, \quad (I)$$

in which X is a hydrolyzable group, R is a substituted or unsubstituted monovalent hydrocarbon group, m is zero or 1, n is zero or a positive integer and a is 1, 2 or 3. Typically and preferably, the groups denoted by R and X in the formula (I) are a methyl group and an isopropenyloxy group of the formula $-O-CCH_3=CH_2$, respectively.

DETAILED DESCRIPTION OF THE PREFERRED EMBODIMENTS

As is understood from the above given summarizing description, the most characteristic ingredient in the inventive RTV composition is the organosilicon-modified polyoxyalkylene compound as the component (d). This compound is particularly effective as a sagging-reducing agent but free from the problem of migration in the RTV composition or bleeding on to the surface thereof in the course of curing because the hydrolyzable terminal groups of the general formula (I) may pertain to the crosslinking reaction in their part to immobilize the polyoxyalkylene moiety in the cured composition.

The component (a) is the principal ingredient in the inventive RTV composition which is a diorganopolysiloxane of a substantially linear molecular structure terminated at both molecular chain ends each with a silanolic hydroxy group. Such a diorganopolysiloxane is usually expressed by the molecular formula

$$HO-(SiR_2-O)_p H, \quad (II)$$

in which R is a monovalent hydrocarbon group such as alkyl groups, e.g. methyl, ethyl, propyl and butyl groups, alkenyl groups, e,g, vinyl and allyl groups, aryl groups, e.g. phenyl and tolyl groups, and cycloalkyl groups, e.g. cyclohexyl group, as well as those substituted groups obtained by the replacement of a part or all of the hydrogen atoms in the above named hydrocarbon groups with substituents such as halogen atoms, cyano groups and the like, and p is a positive integer to give the degree of polymerization of the polysiloxane. It is preferable that the value of the suffix p is sufficiently large to give the diorganopolysiloxane a viscosity in the range from 100 to 1,000,000 centistokes at 25° C. because the RTV composition with a diorganopolysiloxane having a lower viscosity would not give a cured body having good mechanical strengths while a diorganopolysiloxane having a viscosity higher than the above range may cause difficulties and inconveniences in the compounding of the composition and working therewith. It is of course optional that two kinds or more of the monovalent hydrocarbon groups as the groups R are contained in the diorganopolysiloxane as the component (a). It is further optional that, although the diorganopolysiloxane has a linear molecular structure, three-dimensional branches may be contained in the molecules though in a limited amount.

The component (b) is an essential ingredient of the inventive RTV composition, which serves as a crosslinking agent to pertain to the crosslink formation in the composition in the presence of atmospheric moisture. It is an organosilicon compound or a mixture of organosilicon compounds each having at least two hydrolyzable groups in a molecule. It should be noted that the average number of the hydrolyzable groups in the component (b) should be at least 2.01 or, preferably, at least 3.00 per molecule in order to obtain a full effect as the crosslinking agent. This means that a single organosilicon compound having only two hydrolyzable groups in a molecule cannot be used alone as the component (b) but should be used in combination with another organosilicon compound having three or more of hydrolyzable groups in a molecule in such a proportion that the average number of the hydrolyzable groups per molecule is at least 2.01 as is mentioned above.

Such a hydrolyzable organosilicon compound may be an organosilane compound or an organopolysiloxane compound represented by the general formula

$$R_bSiY_cO_{(4-b-c)/2}, \quad \text{(III)}$$

in which R is a substituted or unsubstituted monovalent hydrocarbon group exemplified by those given as the examples of the group R in the component (a), Y is a hydrolyzable group, b is zero or a positive number smaller than 4 and c is a positive number not exceeding 4 with the proviso that b+c is not larger than 4. When b+c is equal to 4, the compound is an organosilane while the compound is an organopolysiloxane when b+c is smaller than 4. The hydrolyzable group denoted by Y is preferably selected from the class consisting of alkoxy, acyloxy, alkenyloxy, ketoxime, substituted or unsubstituted amino and aminoxy and amido groups. A hydrolyzable organosilicon compound having only two hydrolyzable groups in a molecule cannot serve alone as a crosslinking agent although such a compound is effective in decreasing the elastic modulus of the cured RTV composition exhibiting high elongation so that such a difunctionally hydrolyzable compound should be used in combination with another hydrolyzable organosilicon compound having three or more of the hydrolyzable groups in a molecule, which is effective alone as a crosslinking agent, in such a proportion that the average number of the hydrolyzable groups per molecule is at least 2.01.

Exemplary of the tri- and tetrafunctionally hydrolyzable organosilicon compound of the formula (III), in particular with b+c equal to 4, are: alkoxy silanes, e.g. methyl trimethoxysilane, vinyl triethoxysilane, 3-chloropropyl trimethoxysilane and 3-aminopropyl triethoxysilane; oxime silanes, e.g. methyl tris(dimethyloximo) silane, methyl tris(methylethylketoximo) silane and tetra(methylethylketoximo) silane; acyloxy silanes, e.g. vinyl triacetoxy silane and methyl triacetoxy silane; alkenyloxy silanes, e.g. vinyl tripropenyloxy silane and methyl tri(isopropenyloxy) silane; amido silanes, e.g. phenyl tris(N-methylacetamido) silane and vinyl tris(N-ethylacetamido) silane; amino silanes, e.g. vinyl tris(butylamino) silane and phenyl tris(diethylamino) silane; and aminoxy silanes, e.g. methyl tris(dimehylaminoxy) silane and vinyl tris(diethylaminoxy) silane; and the like. These hydrolyzable organosilane compounds may be used either singly or as a combination of two kinds or more according to need. Partial hydrolysis-condensation products of these silane compounds, i.e. organopolysiloxanes, are also suitable for the purpose. The amount of the component (b) in the inventive RTV composition should be in the range from 0.5 to 30 parts by weight per 100 parts by weight of the component (a). When the amount of the component (b) is smaller than above, the curing reaction cannot proceed to a satisfactory extent in the composition while the degree of crosslinking in a RTV composition compounded with an excessively large amount of the component (b) would be so high that the cured composition is imparted with disadvantageously decreased rubbery elasticity if not to mention the economical disadvantage.

The component (c) is a filler which may be a known one used in conventional silicone RTV compositions including fumed silica, precipitated silica, quartz powder, diatomaceous earth, titanium dioxide, aluminum oxide, lead oxide, iron oxide, carbon black, bentonite, graphite powder, calcium carbonate, mica flakes, clay, glass beads, glass microballoons, glass fibers, beads of synthetic resins, e.g. polyvinyl chloride, polystyrene and polymethyl methacrylate, and the like. Particularly preferable are the fumed silica fillers surface-treated with an organosilicon compound such as hexamethyldisilazane, dimethyl dichlorosilane, octamethyl cyclotetrasiloxane and the like. The amount of the component (c) in the inventive RTV composition should be, though widely dependent on the type of the filler, in the range from 5 to 300 parts by weight per 100 parts by weight of the component (a). When no or a too little amount of the filler is added to the composition, the cured rubbery elastomer of the composition would have poor mechanical strengths while a RTV composition compounded with an excessively large amount of the filler would give a cured elastomer having low rubbery elasticity.

The component (d), which is the most characteristic ingredient in the inventive RTV composition, is a polyoxyalkylene compound modified with the organosilicon group represented by the general formula (I) bonded to at least one of the molecular chain terminals. In the general formula (I), the symbol X denotes a hydrolyzable group which may be a similar one to those given as the examples of the group Y in the general formula (III). The symbol R denotes a substituted or unsubstituted monovalent hydrocarbon group which may be one selected from the class given as the examples of the group R in the component (a). The group R is preferably a methyl group. The suffix m is zero or 1 and n is zero or a positive integer while the suffix a is zero, 1, 2 or 3.

The main chain structure per se of the polyoxyalkylene compound is rather conventional and composed substantially of the repetition of the oxyalkylene group of the formula $-R^1-O-$, in which $R^1$ is a divalent hydrocarbon group which should be preferably an ethylene $-C_2H_4-$ or propylene $-C_3H_6-$ group. The organosilicon-modified polyoxyalkylene compound as the component (d) should preferably have an average molecular weight in the range from 400 to 15,000 or, more preferably, in the range from 800 to 8,000. This limitation is partly due to the economical consideration that the polyoxyalkylene compound having an average molecular weight smaller than 400 is somewhat too expensive owing to the increased weight proportion of the organosilicon groups of the general formula (I) which may be bonded either to only one or to both of the molecular chain ends of the polyoxyalkylene main chain. When the average molecular weight is in excess of 15,000, on the other hand, difficulties are encountered in compounding the composition due to the unduly high viscosity of the polyoxyalkylene compound.

The amount of the above described specific polyoxyalkylene compound in the inventive RTV composition should be in the range from 0.1 to 5.0 parts by weight or, preferably, from 0.2 to 2.0 parts by weight per 100 parts by weight of the component (a) since no sufficient sagging-reducing effect can be obtained by adding the component in an amount smaller than the above mentioned lower limit while an excessively large amount of the polyoxyalkylene compound is detrimental to the heat resistance and weathering resistance inherent to the RTV compositions.

The organosilicon-terminated polyoxyalkylene compound can be prepared by the addition reaction between a polyoxyalkylene compound terminated at one or both of the molecular chain ends with an unsaturated group of the formula $+O)_{\overline{m}}CH_2-CH=CH_2$, in which m has the meaning as defined above, and an organosilicon compound having a hydrogen atom directly bonded to the silicon atom and represented by the general formula $H+SiR_2-O)_{\overline{n}}SiR_aX_{3-a}$, in which R, X and n each have the same meaning as defined above, in the presence of a platinum catalyst such as chloroplatinic acid.

Particularly preferable organosilicon terminal groups of the general formula (I) in the component (d) are those of the formula (I) in which n is zero, a is zero, 1 or 2, R is a methyl group and X is a group selected from the class consisting of methoxy, ethoxy, isopropenyloxy and isobutenyloxy groups. Most preferably, the hydrolyzable group X should be an isopropenyloxy group due to the high hydrolyzability thereof in the presence of atmospheric moisture not to retard the curing reaction in the inventive RTV composition so that the excellent properties inherent to the inventive RTV composition can fully be exhibited.

The inventive RTV composition can readily be obtained by uniformly blending the above described components (a) to (d) each in the above defined amount. It is optional that the RTV composition is further admixed, according to need, with a curing catalyst in an amount of, for example, 10 parts by weight or smaller per 100 parts by weight of the component (a). Suitable curing catalysts are exemplified by metal salts of a carboxylic acid, e.g. lead 2-ethylhexoate, dibutyltin diacetate, dibutyltin dilaurate, butyltin tri(2-ethylhexoate), iron 2-ethylhexoate, cobalt 2-ethylhexoate, manganese 2-ethylhexoate, zinc 2-ethylhexoate, tin (II) caprylate, tin naphthenate, tin oleate, tin butyrate, titanium naphthenate, zinc naphthenate, cobalt naphthenate and zinc stearate, organic titanate esters, e.g. tetrabutyl titanate, tetra(2-ethylhexyl) titanate, triethanolamine titanate and tetra(isopropenyloxy) titanate, organotitanosiloxane compounds and the like organic titanium compound, aluminum alkoxides, aminoalkyl-substituted alkoxy silanes, e.g. 3-aminopropyl triethoxy silane and N-(trimethoxysilylpropyl) ethylenediamine, amine compounds and salts thereof, e.g. hexylamine and dodecylamine phosphate, quaternary ammonium salts, e.g. benzyl triethyl ammonium acetate, alkali metal salts of a lower carboxylic acid, e.g. potassium acetate, sodium acetate and lithium oxalate, dialkyl hydroxylamine compounds e.g dimethyl hydroxylamine and diethyl hydroxylamine, and the like.

It is further optional that the inventive RTV composition is admixed with various kinds of known additives according to need including plasticizers, coloring agents, e.g. pigments, heat and cold resistance improvers, flame retardants, fungicidal agents, dehydrating agents, adhesion improvers and others, though each in a limited amount.

In the following, the RTV composition of the invention is described in more detail by way of examples, in which the expression of "parts" in each occurrence refers to "parts by weight" and the values of the viscosity are all those obtained by the measurements at 25° C. In the examples, the decrease in the sagging of the composition was evaluated according to the procedure of the slump test specified in JIS A 5758 and the adhesive strength was evaluated by the test using the H-wise test body specified in the same JIS as above with stainless steel plates of 50 mm by 50 mm by 2 mm dimensions as the substrate bodies.

EXAMPLE 1 (RTV COMPOSITIONS A TO D).

Base compounds A, B, C and D were prepared each by uniformly blending 100 parts of a dimethylpolysiloxane having a viscosity of 20,000 centistokes and terminated at both molecular chain nds each with a silanolic hydroxy group, 12 parts of a dimethylpolysiloxane having a viscosity of 100 centistokes and terminated at both molecular chain ends each with a trimethylsilyl group and 12 parts of a fumed silica filler surface-treated with octamethyl cyclotetrasiloxane together with (compositions A, B and C) or without (composition D) a polyoxyalkylene compound. The amount of the polyoxyalkylene compound, when added, was 0.6 part. The types of the polyoxyalkylene compounds added in the base compounds A, B and C were organosilicon-modified polyoxyalkylene compounds I and II and unmodified polyoxyalkylene compound I indicated by the formulas below, in which Me and Et each denote a methyl and an ethyl group, respectively.

Organosilicon-modified polyoxyalkylene compound I:
$(CH_2=CEt-O-)_2SiMe-C_3H_6-O+C_3H_6-O)_{\overline{30}}(C_2H_4-O)_{\overline{30}}-C_3H_6-SiMe(-O-CEt=CH_2)_2$
Organosilicon-modified polyoxyalkylene compound II:
$(CH_2=CMe-O-)_2SiMe-C_3H_6-O+C_3H_6-O)_{\overline{\phi}}-C_3H_6-SiMe(-O-CMe=CH_2)_2$
Unmodified polyoxyalkylene compound I:
$CH_2=CH-CH_2-O+C_3H_6-O)_{\overline{30}}-(C_2H_4-O)_{\overline{30}}-CH_2-CH=CH_2$ In the next place, 100 parts of each of the base compounds A to D were admixed, under an anhydrous condition, with 8 parts of methyl tris(butanoximo) silane, 0.1 part of dibutyltin dilaurate and 0.5 part of 3-aminopropyl triethoxy silane to give a RTV composition A, B, C or D, respectively, and the thus obtained RTV compositions were subjected to the slump test and the adhesion test to give the results shown in Table 1 below.

As is understood from this table, no sagging at all was noted in the RTV compositions prepared by use of the organosilicon-modified polyoxyalkylene compounds I and II (base compounds A and B) along with the very excellent adhesive strength. On the contrary, the RTV composition prepared by use of the unmodified polyoxyalkylene compound (base compound C) was poor in the adhesive strength although no sagging was noted and the composition prepared without using a sagging-reducing agent (base compound D) was poor in both respects of sagging and adhesive strength.

TABLE 1

| RTV composition | A | B | C | D |
|---|---|---|---|---|
| Slump, mm | 0 | 0 | 0 | 5 |
| Adhesive properties | | | | |
| 50% modulus, kg/cm$^2$ | 4.2 | 4.1 | 4.1 | 4.2 |
| Tensile strength, maximum, kg/cm$^2$ | 8.2 | 8.4 | 6.3 | 7.7 |
| Ultimate elongation, % | 150 | 160 | 100 | 130 |
| Cohesive failure, % | 100 | 100 | 0 | 100 |

Tubes of aluminum foil were filled each with the above prepared RTV composition A or B and kept standing for 3 months in a thermostat at 50° C. and then the RTV compositions squeezed out of the tube were subjected to the same tests as above to find that they have excellent storability to show no noticeable degradation of the properties.

EXAMPLE 2 (RTV COMPOSITION E).

A RTV composition was prepared by uniformly blending 100 parts of the base compound A prepared in the preceding example, 5.0 parts of methyl triacetoxy silane and 0.1 part of dibutyltin dioctoate under an anhydrous condition and the RTV composition was subjected to the slump test and the adhesion test to give the results as follows: slump 0 mm; 50% modulus 4.0 kg/cm$^2$; tensile strength, maximum, 9.2 kg/cm$^2$; ultimate elongation 180%; and cohesive failure 100%.

EXAMPLE 3 (RTV COMPOSITION F)

A RTV composition was prepared by uniformly blending 100 parts of the base compound A prepared in Example 1, 8.0 parts of methyl trimethoxy silane, 0.5 part of 3-aminopropyl triethoxy silane, 0.1 part of dibutyltin dimethoxide and 0.5 part of 3-(trimethoxysilyl) tetramethyl guanidine under an anhydrous condition and the RTV composition was subjected to the slump test and the adhesion test to give the results as follows: slump 0 mm; 50% modulus 3.8 kg/cm$^2$; tensile strength, maximum, 6.6 kg/cm$^2$; ultimate elongation 120%; and cohesive failure 100%.

EXAMPLE 4 (RTV COMPOSITION G)

A RTV composition was prepared by uniformly blending 100 parts of the base compound A prepared in Example 1, 8.0 parts of vinyl tripropenyloxy silane, 0.5 part of 3-aminopropyl triethoxy silane and 0.5 part of 3-(trimethoxysilyl) tetramethyl guanidine under an anhydrous condition and the RTV composition was subjected to the slump test and the adhesion test to give the results as follows: slump 0 mm; 50% modulus 4.1 kg/cm$^2$; tensile strength, maximum, 9.0 kg/cm$^2$; ultimate elongation 160%; and cohesive failure 100%.

EXAMPLE 5 (RTV COMPOSITIONS H TO M)

A base compound was prepared by uniformly blending 100 parts of a dimethylpolysiloxane having a viscosity of 5,000 centistokes and terminated at both molecular chain ends each with a silanolic hydroxy group and 60 parts of a light clacium carbonate filler. RTV compositions were prepared each according to the formulation given in Table 2 below by uniformly blending 100 parts of this base compound with a sagging-reducing agent, curing agent, curing catalyst, which was dibutyltin dioctoate, and adhesion aid, which was N-(2-aminoethyl)aminopropyl trimethoxy silane, each of the kind as shown below and in an amount as indicated in parts in the table, in which the symbols have the meanings indicated below. The results of the slump tests and adhesion tests are shown in Table 2. The RTV compositions of H to K are according to the invention and L and M are for comparative purpose.

Sagging-reducing agents

I: Organosilicon-modified polyoxyalkylene compound II
(see Example 1)

II: Organosilicon-modified polyoxyalkylene compound III $(MeO)_2SiMe-C_3H_6-O(-C_3H_6-O)_{\overline{100}}C_3H_6-SiMe(OMe)_2$ III: Unmodified polyoxyalkylene compound II $HO(-C_2H_4-O)_{\overline{13}}H$ Curing agents I: Methyl tri(cyclohexylamino)silane $Me_3Si-O-SiMe(-NEt-CO-Me)_2$ III: Aminoxy-containing organopolysiloxane I

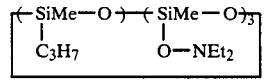

IV: Aminoxy-containing organopolysiloxane II

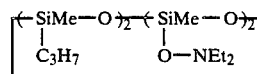

TABLE 2

| Composition | H | I | J | K | L | M |
|---|---|---|---|---|---|---|
| Sagging-reducing agent | | | | | | |
| I | 0.5 | 0.5 | 0.5 | — | — | — |
| II | — | — | — | 0.5 | — | — |
| III | — | — | — | — | 0.5 | — |
| Curing agent | | | | | | |
| I | — | — | 5 | 5 | 5 | 5 |
| II | 2.5 | — | — | — | — | — |
| III | 0.5 | 0.15 | — | — | — | — |
| IV | — | 2.85 | — | — | — | — |
| Curing catalyst | — | — | 0.1 | 0.1 | 0.1 | 0.1 |
| Adhesion aid | — | — | 0.5 | 0.5 | 0.5 | 0.5 |
| Slump, mm | 0 | 0 | 0 | 0 | 0 | 8 |
| Adhesion test | | | | | | |
| Primer on substrate | Yes | Yes | No | No | No | No |
| 50% modulus, kg/cm2 | 2.2 | 1.6 | 3.4 | 3.2 | 3.4 | 3.4 |
| Tensile strength, maximum, kg/cm$^2$ | 5.3 | 6.1 | 5.7 | 5.5 | 4.6 | 5.5 |
| Ultimate elongation, % | 580 | 1080 | 140 | 150 | 90 | 140 |
| Cohesive failure, % | 100 | 100 | 100 | 100 | 0 | 100 |

What is claimed is:

1. A room-curable organopolysiloxane composition which comprises:
   (a) 100 parts by weight of a diorganopolysiloxane of a substantially linear molecular structure terminated at both molecular chain ends each with a silanolic hydroxy group;
   (b) from 0.5 to 30 parts by weight of a compound having the formula $R_bSiY_c$, in which R is a monovalent hydrocarbon group, Y is a hydrolyzable group selected from the class consisting of alkoxy, acyloxy, alkenyloxy, ketoxime, substitute or unsubstituted amino, aminoxy, and amido groups, b is zero or 1 and c is 3 or 4 with the proviso that b+c is 4;
   (c) from 5.0 to 300 parts by weight of a filler; and
   (d) from 0.1 to 5.0 parts by weight of an organosilicon-modified polyoxyalkylene compound of which the molecular main chain is formed of the recurring units represented by the gneral formula —R$^1$—O—, in which R$^1$ is an ethylene or propylene group, and at least one of the molecular chain ends is terminated with a silicon-containing group represented by the general formula $$+O)_mCH_2-CH_2(SiR_2-O)_nSiR_aX_{3-a},$$

in which X is a hydrolyzable group; R is a substituted or unsubstituted monovalent hydrocarbon group, m is zero or 1, n is zero or a positive integer and a is 1, 2 or 3.

2. the room temperature-curable organopolysilozane composition as claimed in claim 1 wherein the hydrolyzable group denoted by the symbol X is selected from the class consisting of alkoxy, acyloxy, alkenyloxy, ketoxime, substituted or unsubstituted amino and aminoxy and amido groups.

3. The room temperature-curable organopolysiloxane composition as claimed in claim 1 wherein m, R and X in component (d) are zero, a methyl group and an isopropenyloxy group, respectively.

* * * * *